United States Patent [19]

Delapierre et al.

[11] 4,306,775
[45] Dec. 22, 1981

[54] ELECTROLYTIC DISPLAY CELL AND CONTROL THEREFOR

[75] Inventors: Gilles Delapierre, Seyssinet; Robert Meyer, Saint Ismier, both of France

[73] Assignee: Commissariat a l'Energie Atomique, Paris, France

[21] Appl. No.: 46,958

[22] Filed: Jun. 8, 1979

[30] Foreign Application Priority Data

Jun. 19, 1978 [FR] France ................................ 7818224

[51] Int. Cl.³ ............................................. G02F 1/29
[52] U.S. Cl. .................................... 350/363; 350/357
[58] Field of Search ................ 350/363, 357; 340/785

[56] References Cited

U.S. PATENT DOCUMENTS 3,096,271 7/1963 Hespenheide ........................ 350/363
3,245,313 4/1966 Zaromb ............................... 350/363
3,807,832 4/1974 Castellion ............................ 350/357
4,150,362 4/1979 Uede et al. .......................... 350/357
4,210,909 7/1980 Hamada et al. ..................... 340/785
4,217,579 8/1980 Hamada et al. ..................... 350/357

FOREIGN PATENT DOCUMENTS 2741702 3/1978 Fed. Rep. of Germany .
2260167 8/1975 France .
1002809 9/1965 United Kingdom .

Primary Examiner—William L. Sikes
Assistant Examiner—Léon Scott, Jr.

[57] ABSTRACT

Apparatus for controlling an electrolytic display cell comprising a supplementary reference electrode in the cell, means for measuring the impedance of the cell across this electrode and means for making at least one of these magnitudes dependent on the impedance.

1 Claim, 1 Drawing Figure

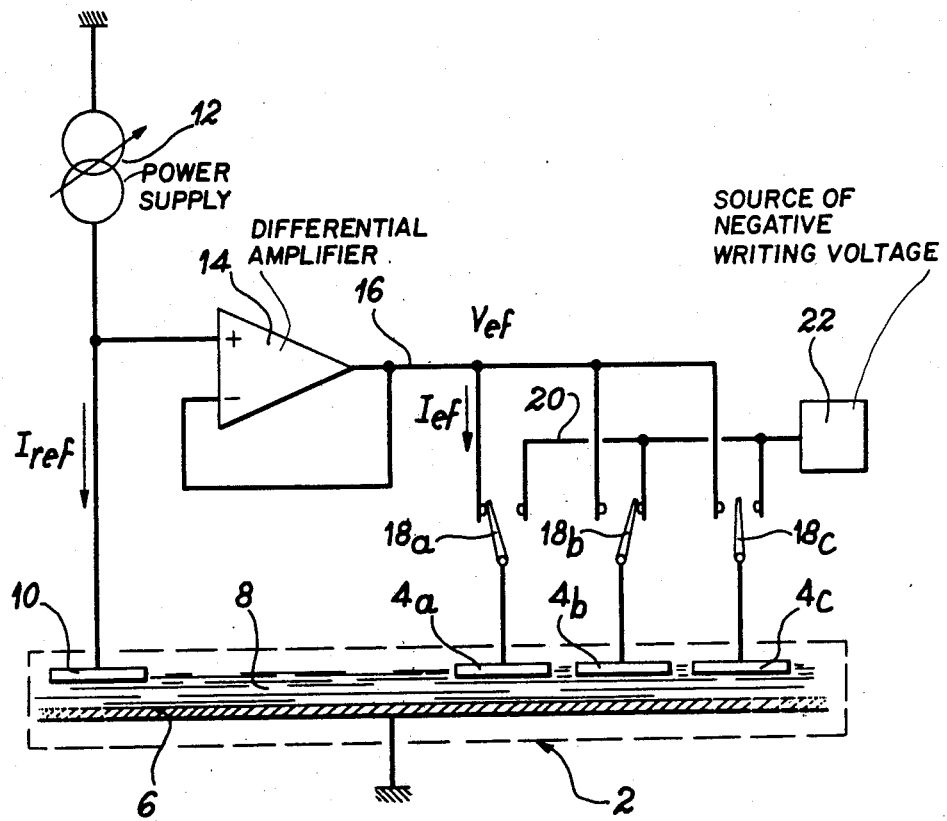

ELECTROLYTIC DISPLAY CELL AND CONTROL THEREFOR

BACKGROUND OF THE INVENTION

The present invention relates to a method for the control of an electrolytic display cell by means of electrical magnitude controlled by a reference electrode and to an apparatus for performing this method. It can be used in the display of alphanumeric characters or the like.

An electrolytic display cell comprising an electrolyte (generally a metal salt) inserted between the appropriately shaped semi-transparent electrodes and a counter electrode. A power supply makes it possible to raise the electrodes to a given potential in order to bring about either the deposition of a metal film (for the display of a character) or the redissolving of this film (for the erasure of the displayed character).

The electrical magnitudes applied (currents or voltages) either during writing and erasure, or optionally during the periods when the written or erased states are maintained must be accurately controlled because the display quality is dependent thereon. Thus, in such display means, the thickness of the deposited metal film is directly proportional to the electrical charge which has passed through the cell and the erasure of this film makes it necessary for an identical charge to traverse the cell in opposite directions. An inadequate charge on erasure leads to an accumulation of metal on the electrode and conversely an excessive charge or erasure can lead to secondary reactions in the electrolyte.

However, the currents and voltages applied to an electrolyte display cell are liable to vary when the operating conditions change (particularly with temperature) or when the cell itself changes (in the composition of its electrolyte for example) or on passing from one cell to another cell due to dispersions which can affect certain components (particularly the surface state of the electrodes) or finally when the electrolyte is changed although the cell is the same. Thus, in practice, it is difficult to maintain the control magnitudes at their most appropriate value.

BRIEF SUMMARY OF THE INVENTION

The invention solves this problem by providing a means which is able to translate the state of the cell into a magnitude which can be used to control the electrical control magnitude or magnitudes. This means comprises a reference electrode placed in the cell and a circuit which is able to measure the impedance of the cell through the said electrode. At each instant, this impedance reflects the state of the cell making it possible to appropriately modify the electrical control magnitudes of the cell as a function of possible changes to this state.

More specifically, the present invention relates to a method for the control of an electrolytic display cell by means of electrical writing and erasure magnitudes applied to electrodes, wherein the impedance of this cell is measured across a supplementary electrode which serves as the reference electrode and wherein this measurement is used for controlling at least one of the said magnitudes.

The controlled electrical magnitude can be of a random nature, for example, voltage, current, application duration, load quantity, etc and this can either be by writing and/or erasure. However, a magnitude which it is of particular interest to control is the erasure voltage and the reasons for this will now be explained.

In the case of cells where the electrolytic solution is a metal halide (silver iodide for example) it is advantageous to apply to the erasure electrodes a voltage which is slightly higher than the threshold voltage for the electrochemical formation of halogen. In this case, while metal is present on the electrode dissolving takes place under a relatively high current (the dissolving overvoltage of the metals used, particularly silver, is substantially 0) and as soon as dissolving is complete the current drops to a very low value.

This erasure control procedure for an electrolytic display cell formed the subject matter of French Patent Application EN 78 18223 filed on June 19th, 1978.

However, this control method comes up against a realisation problem due to the fact that the currents used are low (of the order of 0.1 $\mu A/mm^2$) and vary very rapidly with the voltage applied and the temperature (by a factor of 10 for a voltage variation of 50 mV or for a temperature variation of 30° C.). These currents also vary from one cell to the next for the same voltage.

If the current corresponding to the formation of iodine is very low, there can be an accumulation of silver. If it is too high, it is possible to have non-homogeneity of appearance or excessive consumption in certain applications. For example, on passing from 0.1 to 1 $\mu A/mm^2$, the consumption of a watch display means increases by 15 $\mu A$, whilst the generally permitted total consumption is about 10 $\mu A$.

The method according to the present invention obviates this disadvantage because it makes it possible to control the erasure voltage by the desired value in such a way that it always remains close to the threshold voltage for the electrochemical formation of halogen, despite the fluctuations which can affect the operating conditions of the cell. Preferably, the present impedance of the cell is measured by circulating through it and the reference electrode a low reference current density which is equal to the desired current density and the erasure voltage of the working electrodes is made dependent on the reference electrode voltage.

The invention also relates to an apparatus for the control of an electrolytic display cell which utilizes the method defined hereinbefore. This apparatus comprises a control circuit which is able to apply to the electrodes of the cell electrical writing and erasure magnitudes, wherein it comprises additionally a supplementary reference electrode located in the cell, means for measuring the impedance of the cell across said electrode and means for controlling at least one of the said magnitudes by the impedance.

Preferably, the cell control circuit comprises an erasure voltage generator which is controlled by said impedance.

Preferably, when the cell comprises a metal halide-based electrolyte, the erasure voltage generator is controlled by a value which is slightly higher than the voltage for the electrochemical formation of halogen.

Finally, the invention relates to an electrolytic display cell wherein it comprises a supplementary reference electrode.

DESCRIPTION OF THE DRAWING AND PREFERRED EMBODIMENTS

The features and advantages of the invention can be gathered better from the following description of a preferred and non-limitative embodiment, with reference to the drawing which shows an embodiment of the apparatus according to the invention.

The electrolytic display cell 2 shown in the drawing comprises in per se known manner transparent electrodes 4a, 4b, 4c, a counter electrode 6 and a film 8 of electrolytic solution. According to the invention, the cell 2 also comprises a reference electrode 10 and means which are able to measure the impedance of the cell across said electrode. In the drawing, these means comprise a power supply 12 which supplies a reference current $I_{ref}$ across electrode 10 and a differential amplifier 14, whose non-inverting input is connected to the reference electrode 10 and whose inverting input is connected to the output 16. This output supplies an erasure voltage Vef which is controlled by the voltage applied to the electrode and therefore the reference current $I_{ref}$ which passes through the cell. Each working electrode 4a, 4b, 4c, is connected by switching members 18a, 18b, 18c, either to the output 16 when the electrode has to be erased (i.e. in the case of electrode 4a), or to a connection 20 connected to the output of a source 22 of negative writing voltage when the electrode must be written (i.e. the case of electrode 4b) or remains "in the air" in the case where the written state is to be maintained, i.e. in the case of electrode 4c.

The circuit makes it possible to obtain an erasure voltage Vef which is always equal to the value which gives the permanent erasure current density Ief circulating through the working electrode, when all the silver is disappeared, a value equal to the reference value $I_{ref}$, whereby this applies no matter what the environment of the display cell and the dispersion of its characteristics.

It is naturally advantageous to use an erasure current generator 12 which can be regulated in order to be able to adjust the reference current value or finally the permanent erasure current or to vary it during operation.

Another example for the application of the above-described principle can be the control of the writing current from the voltage $e_{ref}$ of the current-supplied reference electrode.

For reasons of reliability it has been found that the writing current must not exceed a maximum value called the saturation current, which drops when the temperature drops.

A simple way to control this current is to supply the cell with a writing voltage generator E in series with a resistor R, it then being possible to control the writing current via the value of E.

According to the invention, the temperature detecting elements used is the reference electrode, whose voltage $E_{ref}$ increases when the temperature decreases. For the writing current to drop when the temperature drops it is merely necessary for the voltage generator E to satisfy the relationship $E = -V_O + KE_{ref}$ in which $V_O$ is a constant positive voltage. Such a generator can easily be constructed by means of operational amplifiers. $V_O$ and K can be dependent on the selected electrolyte and typical values are $V_O = 3$ to 4 V; K = 2 to 3.

With respect to the means for measuring the impedance of the cell by the reference electrode, it is obvious that without passing beyond the scope of the invention it is possible to provide a power supply and current measuring means.

What is claimed is:

1. An electrolytic display comprising:
   a display electrolytic cell including a counter electrode, a reference electrode and a plurality of display electrodes spaced from each other and from said counter electrode, and an electrolyte contacting all said electrodes and filling the space therebetween, said reference and display electrodes being in contact with one face of said electrolyte and said counter electrode in contact with the opposite face;
   a negative voltage source;
   a constant current generator so connected between said counter electrode and said reference electrode as to cause a positive voltage to appear on said reference electrode;
   an operational amplifier having its noninverting input connected to said reference electrode; and
   switching means connected to each of said display electrodes for selective connection of each to said negative voltage source or to the output of said amplifier;
   whereby the magnitude of erasing voltage supplied to said display electrodes when connected by said switching means to the output of said amplifier is dependent upon the impedance of said cell as determined by said reference electrode and constant current generator.

* * * * *